(12) United States Patent
Friese

(10) Patent No.: US 8,503,054 B2
(45) Date of Patent: Aug. 6, 2013

(54) DEVICE FOR DEFLECTING LIGHT BEAMS

(75) Inventor: Christoph Friese, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 730 days.

(21) Appl. No.: 12/701,717

(22) Filed: Feb. 8, 2010

(65) Prior Publication Data

US 2010/0202032 A1 Aug. 12, 2010

(30) Foreign Application Priority Data

Feb. 9, 2009 (DE) .......................... 10 2009 000 724

(51) Int. Cl.
*G02B 26/08* (2006.01)

(52) U.S. Cl.
USPC ................. 359/202.1; 359/199.2; 359/200.6; 359/201.1

(58) Field of Classification Search
USPC .............................. 359/196.1–226.2; 385/25
See application file for complete search history.

(56) References Cited

U.S. PATENT DOCUMENTS

| | | | |
|---|---|---|---|
| 5,521,367 A * | 5/1996 | Bard et al. ............... | 235/472.01 |
| 7,068,878 B2 * | 6/2006 | Crossman-Bosworth et al. ............................. | 385/25 |
| 2002/0064341 A1 * | 5/2002 | Fauver et al. ................... | 385/25 |

* cited by examiner

*Primary Examiner* — James Phan
(74) *Attorney, Agent, or Firm* — Kenyon & Kenyon LLP

(57) ABSTRACT

A device for deflecting light beams is provided, which includes a swing-mounted light exit segment of an optical waveguide and a swing-mounted mirror. The device features a first rotation device that is set up to rotate the light exit segment of the optical waveguide, from which light is able to strike the mirror, in a rotational plane, and a second rotation device that is set up to rotate the mirror around a rotational axis situated in the mirror plane, which deviates from the vertical to the rotational plane.

15 Claims, 4 Drawing Sheets

DEVICE FOR DEFLECTING LIGHT BEAMS

RELATED APPLICATION INFORMATION

The present application claims priority to and the benefit of German patent application no. 100 2009 000 724.5, which was filed in Germany on Feb. 9, 2009, the disclosure of which is incorporated herein by reference.

FIELD OF THE INVENTION

The present invention describes a device for deflecting light beams.

BACKGROUND INFORMATION

Presently, among other things, micromirrors or micromirror arrays are used for the optical deflection of light beams, as performed in projectors or in scanners, for example. Today, the use of such micromirrors is also being considered for head-up displays in motor vehicles.

As a rule, micromirrors have two swivel axes that are perpendicular to each other. In two-axis micromirrors, the mirror is usually suspended cardanically on a movable frame. For the purpose of deflecting light beams in two mutually independent spatial directions (2D=two-dimensional) or for the purpose of changing the direction of deflection of the light beams in two independent spatial planes, it must be possible to drive the control shafts of the two rotational axes of the mirror independently of each other. The rotations of the mirrors around the two axes must also be detected separately from one another as part of a regulation of the light deflection. Moreover, the two independent rotation mechanisms may also have different or opposite requirements with regard to their environmental conditions (i.e., air pressure/vacuum). Such systems for light deflection are therefore complex, expensive, and susceptible to faults.

In particular for designing and manufacturing a scanner, instead of such a complex 2D system, for example, it would be possible to combine two separate 1D scanners (that is, mirrors that rotate around only one single axis), which would allow for the two individual scanners to be optimized separately and independently. However, this would have the disadvantage that both 1D scanners would have to be adjusted to one another in a painstaking manner. Thus, in such an arrangement, no reduction of the size or the complexity of the overall system is to be expected.

The optics of imaging systems presents an additional challenge. These frequently use three color light sources, e.g., red, green, and blue laser diodes (=R-LD, G-LD, B-LD). The light radiation of these laser diodes must be brought into coincidence in order to be focused jointly onto a projection surface.

SUMMARY OF THE INVENTION

The exemplary embodiments and/or exemplary methods of the present invention provides a device that overcomes the above-mentioned limitations. According to the exemplary embodiments and/or exemplary methods of the present invention, a device for deflecting light beams is provided, which features a swing-mounted light exit segment of an optical waveguide and a swing-mounted mirror. The device also includes:

a first rotation device that is set up to rotate the light exit segment of the optical waveguide, from which light is able to strike the mirror, in a rotational plane, and a second rotation device that is set up to rotate the mirror around a rotational axis situated in the mirror plane, which deviates from the perpendicular to the rotational plane. The advantage of the device according to the exemplary embodiments and/or exemplary methods of the present invention is that the deflection of the light rays with the aid of a mirror can occur only in one spatial direction. In other words, the change of the direction of deflection of the light beams with the aid of a mirror can only occur in one spatial plane. A simple 1D scanner may be used for such a deflection of light beams or modification of the direction of deflection of light beams. The direction of deflection of the light beams in another, independent spatial plane is modified by rotating the optical waveguide or the optical fiber itself. The modification of the direction of deflection of the light beams in two spatial planes that are independent of each other is thus based on two different, simple principles that may be implemented easily and that have a low susceptibility to faults.

The device may be set up (configured) to deflect light beams in two independent spatial directions by the fact that the rotational axis of the mirror is situated parallel to the rotational plane of the light exit segment of the optical waveguide. It is particularly advantageous if the rotational axis of the mirror is situated perpendicular to the longitudinal axis of the light exit segment when the latter is in a position of rest. This results in the maximum change of angle of the direction of deflection of the light beams per degree of rotation of the mirror or of the optical waveguide.

The first rotation device may include at least one electrode for producing an electric field, which is set up to exert an electrostatic force on the light exit segment of the optical waveguide. To this end, the electrodes are connected to a voltage source, for example, via which the electrodes may be charged variably to a potential. The light exit segment of the optical waveguide is optionally provided with an electrically conductive coating. This coating may also be connected to the voltage source, via which the coating may be charged to an opposite potential (relative to the potential of the electrodes), in order to be able to control the attracting or repelling electrostatic force between light exit segment and electrodes.

It is advantageous if the at least one electrode is electrically insulated from the light exit segment by a non-conductive layer. Alternatively, the light exit segment may also be provided with a non-conductive exterior coating. In this manner, it is possible to prevent the potentials of the light exit segment and the electrode from being short-circuited when the light exit segment touches the electrode. Otherwise, if mutual contact occurred between the light exit segment and the electrode, the potential difference between the two components would be equalized, which would result in a cancellation of the electrostatic force.

At least one of the electrodes may be disposed such that when a voltage is applied to the electrode, the light exit segment of the optical waveguide is able to be deflected from its position of rest in the rotational plane crosswise to its longitudinal axis. It is advantageous if the optical waveguide is clamped in a holding device out of which the light exit segment projects. The electrodes are disposed in immediate proximity, to the side of the light exit segment. The electrostatic force between electrode and light exit segment bends the free end of the light exit segment toward the clamping point. It is advantageous for the bending resistance of the light exit segment to be adjusted such that a predetermined charging of the electrode is sufficient to achieve a predetermined bending of the light exit segment and thus a predetermined change in angle of the light exit direction.

As an alternative to the rotation of the light exit segment via an electrostatic force, it is also possible to implement the first rotation device by coating the light exit segment of the optical waveguide with a piezoactive ceramic. When an electric voltage is applied to the light exit segment, a mechanical tension may be produced in the optical-waveguide ceramic composite, which tension is able to produce a bending of the light exit segment. The two operative mechanisms (electrostatic and mechanical action of force on the light exit segment) may also be implemented cumulatively, in order to achieve a rotation or bending of the light exit segment.

According to a specific embodiment of the present invention, multiple electrodes are disposed side-by-side, parallel to the rotational plane of the light exit segment of the optical waveguide, and it is possible to apply a voltage to each electrode independently, so that through the selective and/or cumulative action of force of one or more electrodes on the light exit segment, bending states of variable magnitude of the light exit segment are achievable within the rotational plane. A plurality of electrode sectors may be disposed below and/or above the light exit segment in the shape of a fan.

When one of these electrode sectors has voltage applied to it, then a force is produced between the electrode surface and the coated light exit segment. This force causes the light exit segment to bend on the side beyond its clamping point and thus causes a movement of the light exit segment in the direction of the respectively activated electrode sector. Electrode sectors that are situated next to each other may be switchable in direct time succession, that is, in a sequential manner, so that the light exit segment is passed on from electrode sector to electrode sector and thus may be bent further and further (up to a maximum bending if the light exit segment is situated above/below an outermost electrode sector of the electrode fan).

The advantage of such a sequential connection of the electrodes is that particularly the outer electrodes of the fan do not have to be charged as highly in order to be able to exert a sufficient attraction force on the light exit segment, for the electrostatic attraction force decreases by the square of the distance between the electrode and the light exit segment. In addition, the restoring force, which results from the bending of the light exit segment, on the light exit segment in the region of the outer electrode sectors of the fan is greater than in the region of the inner electrode sectors in the vicinity of the position of rest of the light exit segment. This (spring) force of the light exit segment increases by the square of the deflection from the position of rest. For this reason, the charge of the outer electrode sectors has to be greater than the charge of the inner electrode sectors in any case, in order to move the light exit segment against its restoring force over/under the respective electrode sector. By using the above-described sequential charging of the electrode sectors, this higher charge of the outer electrode sectors may be reduced. By varying the voltages applied to the electrode sectors, a continual movement/bending of the light exit segment in the rotational plane may thus be achieved.

In accordance with an additional specific embodiment of the present invention, the light exit segment of the optical waveguide is disposed between two electrode blocks whose distance from one another broadens from the clamping point of the light exit segment to its light-emitting end. The electrode blocks may feature electrode surfaces that are curved away from the light exit segment and that delimit the maximum range of motion of the light exit segment at a predefined applied voltage. If the electrode blocks are charged to this predefined voltage, the light exit segment bends so far that it hugs the curved electrode surface of one of the two electrode blocks and abuts there. This simple system may be configured for a bistable deflection of the light exit segment, in that the light exit segment lies against either the one or the other electrode block.

The subsequently described additional specific embodiment constitutes a further refinement of the preceding specific embodiment. In this instance, the electrode blocks are segmented in the longitudinal direction of the light exit segment. A voltage may be applied independently to each of the segments, which may be insulated from one another. The electrode surfaces of a segment form an angle with the light exit segment in the position of rest, and the farther removed the segment is from the clamping point of the light exit segment, the greater the size of the angle.

Similarly to the above-described specific embodiment of the present invention having the electrode sectors in fan form, this specific embodiment also allows the individual electrode segments to be switched in a sequential manner, so that the light exit segment lies against more and more electrode segments, one after another—starting from the electrode segment situated directly at the clamping point of the light exit segment, up to the outermost electrode segment at the light exit end of the light exit segment—and thus may be bent further and further (up to a maximum bending, when the light exit segment lies against all electrode segments of one of the two electrode blocks).

The electrode surfaces of the segments, which are respectively adjusted by a specific angle, may be level, i.e., do not have a curve. This allows for the light exit segment to project beyond the activated electrode segment in a straight extension when abutting on the activated electrode segment. In this manner, the various adjustment angles of the electrode segments make it possible to achieve a specific light exit direction for each electrode segment surface.

The insulations between the electrode segments may protrude beyond the electrode surfaces and act as a stop for the light exit segment bent in the direction of the electrode segments. This makes it possible to omit an electric insulation of the light exit segment and/or of the electrode surfaces, since the stops prevent a contacting between the light exit segment and the electrode surfaces.

Further features and advantages of specific embodiments of the present invention result from the following description with reference to the enclosed figures.

DETAILED DESCRIPTION

Figure 1:
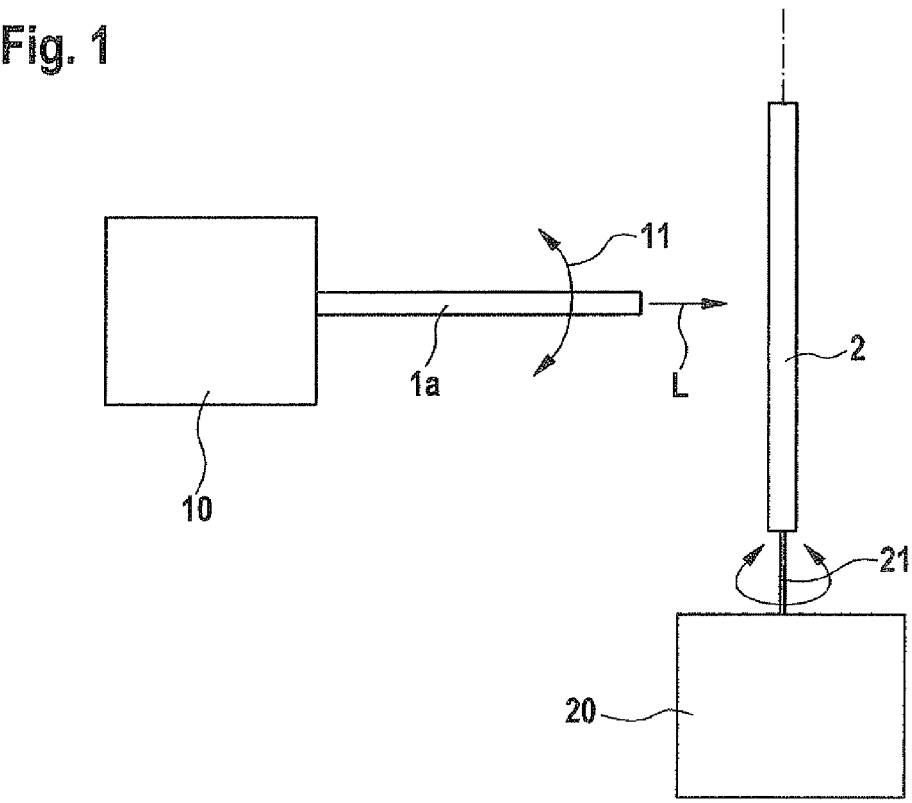
FIG. 1 shows a first specific embodiment of the device according to the present invention.

FIG. 1 illustrates a first specific embodiment of the device according to the present invention for deflecting light beams, which features a swing-mounted light exit segment 1a of an optical waveguide 1 (light-conducting fiber or optical fiber) and a swing-mounted mirror 2. The device also includes a first rotation device 10 that is set up to rotate light exit segment 1a of optical waveguide 1, from which light L is able to strike mirror 2, in a rotational plane 11, and a second rotation device 20 that is set up to rotate mirror 2 around a rotational axis 21 situated in the mirror plane, which deviates from the vertical to rotational plane 11. In the view shown by FIG. 1, rotational plane 11 (=plane which is generated by the different rotational states or bending states of light exit segment 1a) of light exit segment 1a is oriented vertically and rotational axis 21, around which mirror 2 illustrated in the lateral view is swing-mounted, is also oriented vertically. However, any other orientation is also possible, in particular also a horizontal orientation of rotational plane 11.

Figure 2:
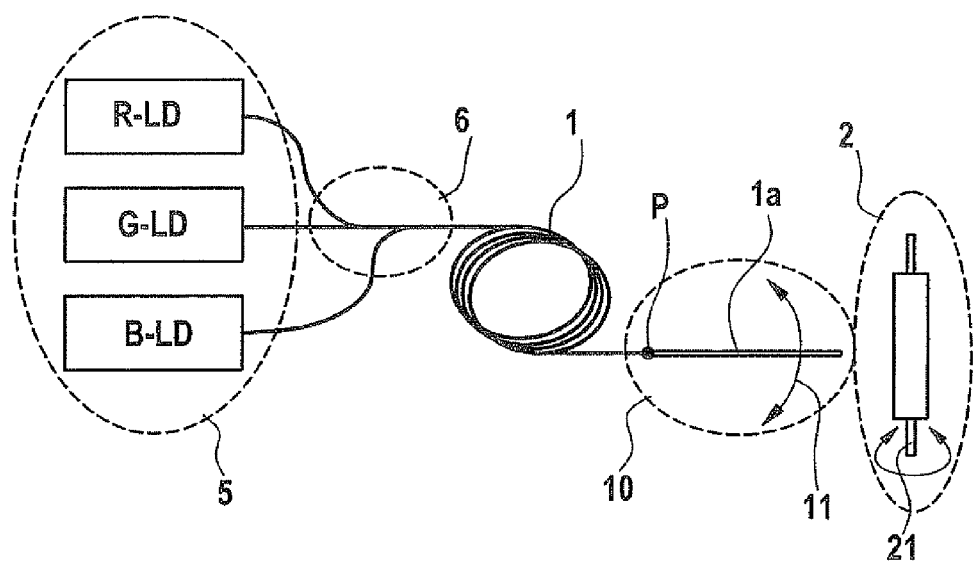
FIG. 2 shows a second specific embodiment of the device according to the present invention.

FIG. 2 shows a second specific embodiment of the device according to the present invention. In addition to the components from the first specific embodiment, which are labeled with the same reference numerals, this second specific embodiment also includes a light source 5 in the form of a red laser diode R-D, a green laser diode G-LD, and a blue laser diode B-LD. The light of these laser diodes is coupled into the optical waveguide. The three optical waveguides may optionally be coupled together into one single optical waveguide 1 via one or a plurality of fiber couplers 6. This optical waveguide 1 is clamped in a holding device in such a manner that light exit segment 1a, which extends from clamping point P to the light exit end of the light conducting fiber, is able to oscillate freely. Alternatively, the three optical waveguides may also be guided in parallel up to the light exit end and oscillate synchronously.

Figure 3A:
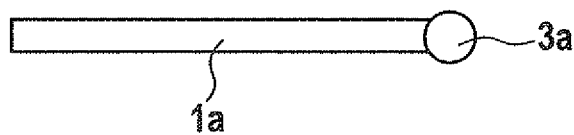
FIG. 3a shows a first specific embodiment of a light exit segment of an optical waveguide.
Figure 3B:
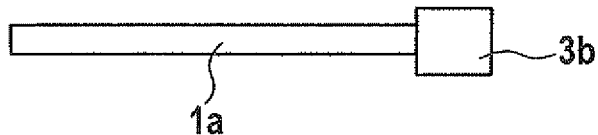
FIG. 3b shows a second specific embodiment of a light exit segment of an optical waveguide.

The end of an optical waveguide largely corresponds to a point source and thus produces a spherical wave or a strongly diverging light beam. In order to avoid this effect, focusing optics may be mounted at the light exit end (fiber output). FIGS. 3a and 3b illustrate two specific embodiments of such focusing optics. FIG. 3a illustrates the option of producing a spherical lens by melting the light exit end of light exit segment 1a. Alternatively, a spherical lens or a so-called GRIN lens (lens having a refractive index gradient) may also be bonded on the fiber end.

Figure 5:
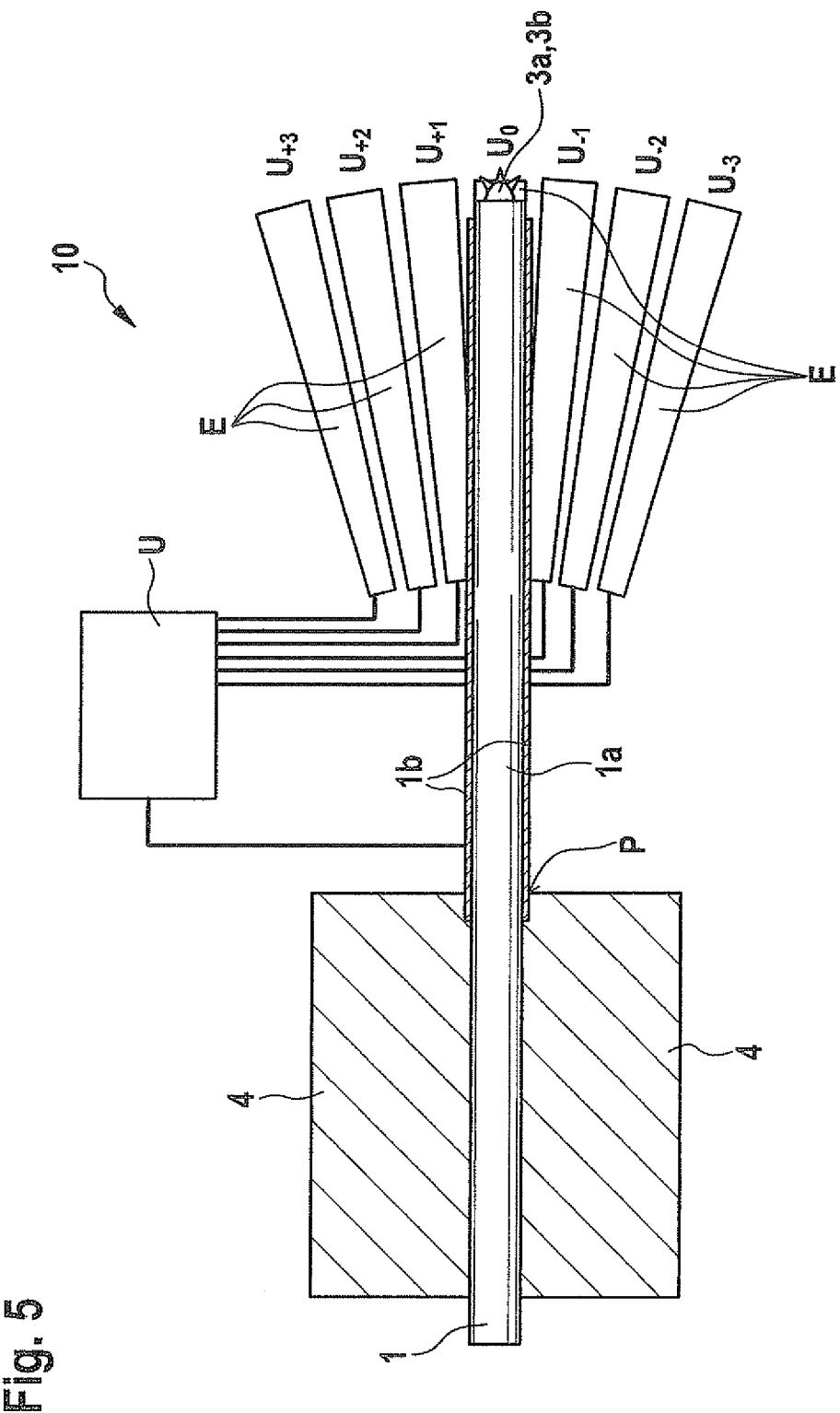
FIG. 5 shows a third specific embodiment of the device according to the present invention.

FIG. 5 now shows a third specific embodiment of the device according to the present invention. In this instance, a plurality of electrodes E are disposed side-by-side, parallel to rotational plane 11 of light exit segment 1a of optical waveguide 1, and it is possible to apply a voltage $U_{+3}$, $U_{+2}$, $U_{+1}$, $U_0$, $U_{-1}$, $U_{-2}$, $U_{-3}$ to each electrode independently via a voltage supply U, so that through the selective and/or cumulative action of force of one or more electrodes E on light exit segment 1a, bending states of variable magnitude of light exit segment 1a are able to be achieved within rotational plane 11. In FIG. 5, seven electrode sectors E are disposed in the plane below and/or above light conducting fiber 1a. The surface of middle electrode sector E is covered by fiber 1a if the latter is in the position of rest/zero position. However, it is also possible to omit this surface, since fiber 1a ends up in this position on its own, without external action of force. Outside of the position of rest, three electrode sectors E are respectively located to the left and right of light exit segment 1a. However, more or fewer sectors are also conceivable. If one of these sectors has voltage applied to it, then it produces a force between the electrode surface and coated fiber 1a, 1b. This force causes a bending of fiber 1a and a movement in the direction of activated sector surface E. Mounting a plurality of surfaces or varying the applied voltage thus allows for a continual movement of fiber 1a.

Figure 4A:
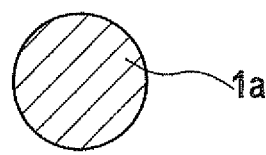
FIG. 4a shows a third specific embodiment of a light exit segment of an optical waveguide.
Figure 4B:
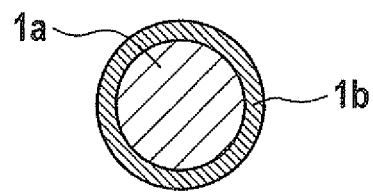
FIG. 4b shows a fourth specific embodiment of a light exit segment of an optical waveguide.
Figure 4C:
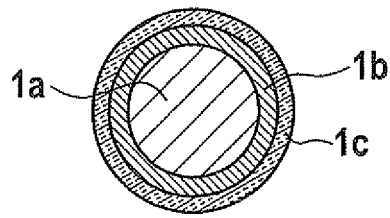
FIG. 4c shows a fifth specific embodiment of a light exit segment of an optical waveguide.

Light exit segment 1a may have different coatings, as may be seen from the cross-sectional drawings of FIG. 4. FIG. 4a shows the bare optical waveguide of light exit segment 1a without a coating. However, light exit segment 1a of optical waveguide 1 may also be provided with an electrically conductive coating 1b in accordance with FIG. 4b. This coating 1b may also be connected to voltage source U, via which coating 1b is able to be charged to an opposite potential (relative to the potential of the electrodes), in order to be able to control the attracting or repelling electrostatic force between light exit segment 1a and electrodes E. Conductive coating 1b may be metallic and may be deposited by vapor depositing or sputtering, for example, or it may also be made of a conductive polymer. Instead of being contacted by voltage source U, this conductive coating may be contacted via the holding device (fiber routing) of light exit segment 1a and connected to ground, for example. Furthermore, in accordance with FIG. 4c, it is possible to provide light exit segment 1a with a non-conductive exterior coating 1c. In this manner, it is possible to prevent the potentials from light exit segment 1a, or its conductive coating 1b, and electrode E from being short-circuited when light exit segment 1a contacts electrode E.

Figure 6:
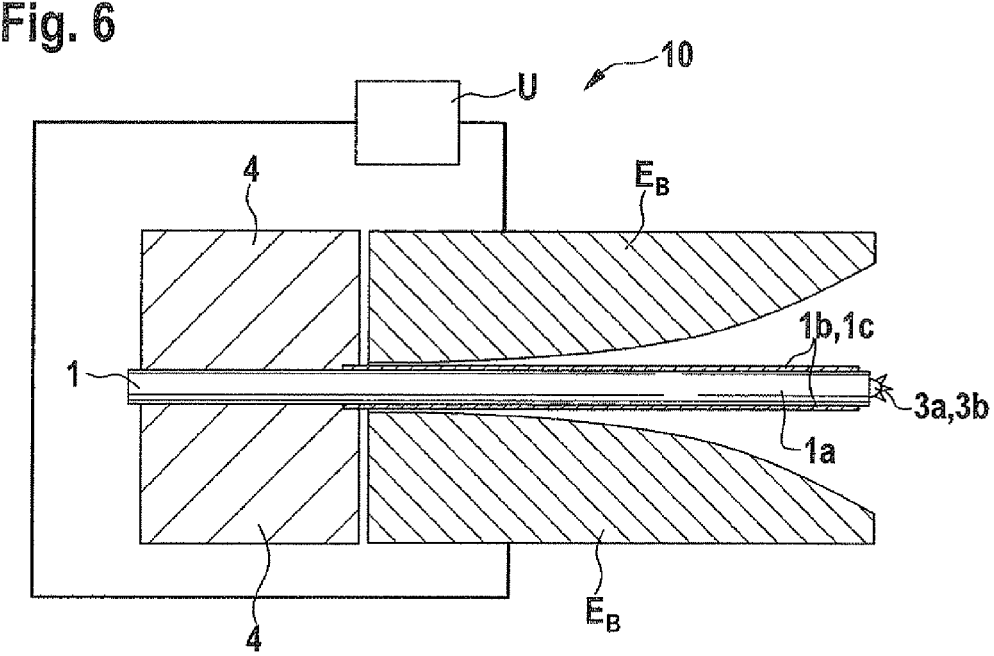
FIG. 6 shows a fourth specific embodiment of the device according to the present invention.

FIG. 6 shows a fourth specific embodiment of the device according to the present invention. In this instance, light exit segment 1a of optical waveguide 1 is disposed between two electrode blocks $E_B$, which have a distance between them that broadens from clamping point P of light exit segment 1a to its light-emitting end 3a, 3b. In this context, electrode blocks $E_B$ may feature electrode surfaces that are curved away from light exit segment 1a and that delimit the maximum range of motion of light exit segment 1a when a predetermined voltage U is applied. If electrode blocks $E_B$ are charged to this predetermined voltage U, light exit segment 1a bends so far that it hugs the curved electrode surface of one of the two electrode blocks $E_B$ and abuts there. This simple system may be configured for a bistable deflection of light exit segment 1a, in that light exit segment 1a lies against either the one or the other electrode block $E_B$.

Figure 7:
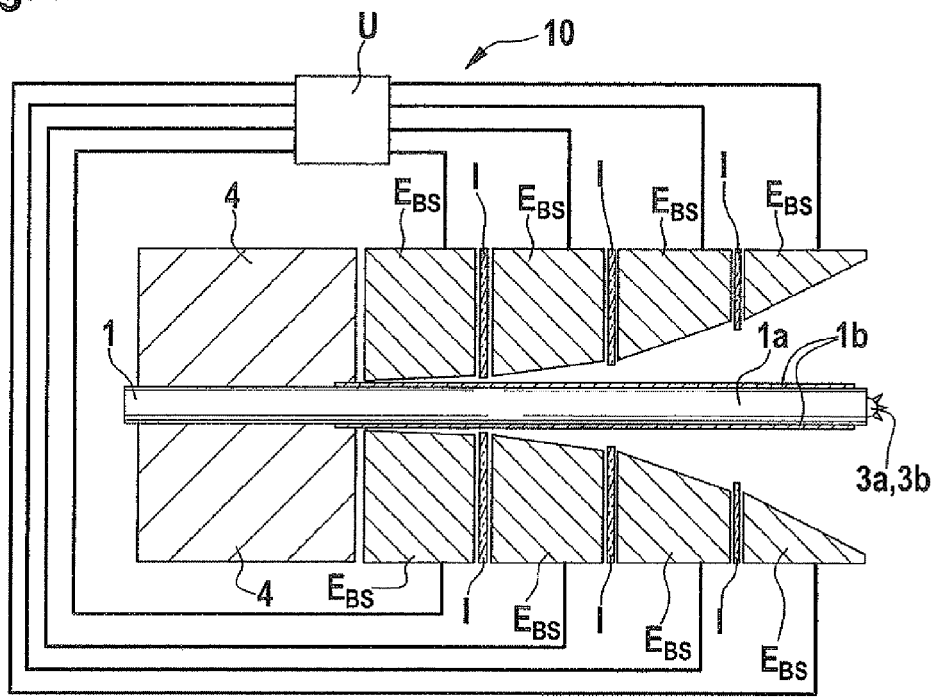
FIG. 7 shows a fifth specific embodiment of the device according to the present invention.

FIG. 7 shows a fifth specific embodiment of the device according to the present invention, which constitutes a further refinement of the fourth specific embodiment. In this instance, electrode blocks $E_B$ are segmented in the longitudinal direction of light exit segment 1a. A voltage U is independently applicable to segments $E_{BS}$, which are insulated (="I") from one another. The electrode surface of a segment $E_{BS}$ forms an angle with light exit segment 1a in the position of rest, and the farther removed segment $E_{BS}$ is from clamping point P of light exit segment 1a, the greater the size of the angle. The individual electrode surfaces of segments $E_{BS}$ respectively feature a specific angle to optical fiber 1a in the position of rest. Due to the fact that segments $E_{BS}$ are able to be switched on and off independently, fiber 1a may be bent incrementally.

In order to prevent non-insulated light exit segment 1a from contacting likewise non-insulated electrode surfaces $E_{BS}$, insulations I between segments $E_{BS}$ may project beyond the electrode surfaces and act as a stop for light exit segment 1a when it is bent in the direction of segments $E_{BS}$.

The reference symbols and references to figures in the following claims serve exclusively for easier orientation in the application documents and are by no means to be understood in a way that restricts the subject matter of the claim to a specific embodiment shown in the figures or explained in the description.

What is claimed is:

1. A device for deflecting light beams, comprising:
   a swing-mounted light exit segment of an optical waveguide;
   a swing-mounted mirror;
   a first rotation device that is configured to rotate the light exit segment of the optical waveguide, from which light is able to strike the mirror, in a rotational plane; and
   a second rotation device that is configured to rotate the mirror around a rotational axis situated in the mirror plane, which deviates from a vertical to the rotational plane.

2. The device of claim 1, which is configured to deflect light beams in two independent spatial directions by the fact that the rotational axis of the mirror is situated parallel to the rotational plane of the light exit segment of the optical waveguide.

3. The device of claim 2, wherein the rotational axis of the mirror is situated perpendicularly to a longitudinal axis of the light exit segment when the latter is in a position of rest.

4. The device of claim 1, wherein the first rotation device includes at least one electrode for producing an electric field, which is configured to exert an electrostatic force on the light exit segment of the optical waveguide.

5. The device of claim 4, wherein at least one of the electrodes is disposed such that when a voltage is applied to the electrode, the light exit segment of the optical waveguide is able to be deflected from its position of rest in the rotational plane crosswise to its longitudinal axis.

6. The device of claim 5, wherein a plurality of electrodes is disposed side-by-side, parallel to the rotational plane of the light exit segment of the optical waveguide, so that a voltage is appliable to each electrode independently, so that through at least one of a selective action and a cumulative action of force of at least one electrode on the light exit segment, bending states of variable magnitude of the light exit segment are achievable within the rotational plane.

7. The device of claim 5, wherein the light exit segment of the optical waveguide is disposed between two electrode blocks whose distance from one another broadens from the clamping point of the light exit segment to its light-emitting end.

8. The device of claim 7, wherein the electrode blocks include electrode surfaces that are curved away from the light exit segment and that delimit the maximum range of motion of the light exit segment at a predefined applied voltage.

9. The device of claim 7, wherein the electrode blocks are segmented in the longitudinal direction of the light exit segment and a voltage is appliable independently to each of the segments that are insulated from one another, the electrode surface of a segment forming an angle with the light exit segment in the position of rest, and the farther removed the segment is from the clamping point of the light exit segment, the greater the angle with the light exit segment in the position of rest.

10. The device of claim 9, wherein the insulations between the segments protruding beyond the electrode surfaces and acting as a stop for the light exit segment bent in the direction of the segments.

11. The device of claim 5, wherein the voltage applicable to the electrodes is variable.

12. The device of claim 1, wherein the light exit segment of the optical waveguide is provided with an electrically conductive coating.

13. The device of claim 12, wherein the at least one electrode is electrically insulated from the light exit segment by a non-conductive layer.

14. The device of claim 12, wherein the light exit segment is provided with a non-conductive exterior coating.

15. The device of claim 1, wherein the first rotation device is implemented by coating the light exit segment of the optical waveguide with a piezoactive ceramic so that when an electrical voltage is applied, a mechanical tension is able to be produced in the optical-waveguide-ceramic composite, which makes it possible to effect a bending of the light exit segment.

* * * * *